Nov. 15, 1927.
W. F. HEROLD
1,649,529
CASTER
Filed Dec. 10, 1926
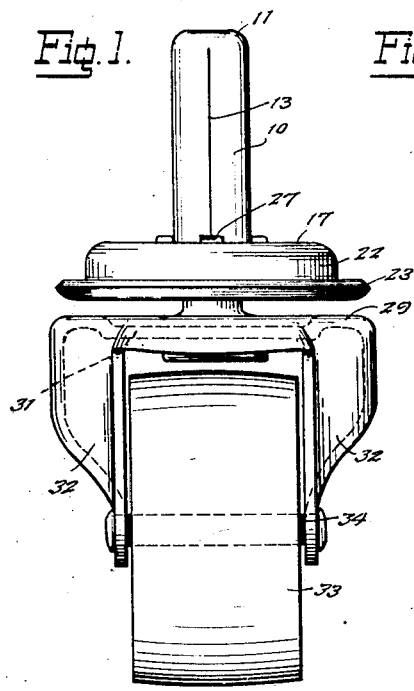
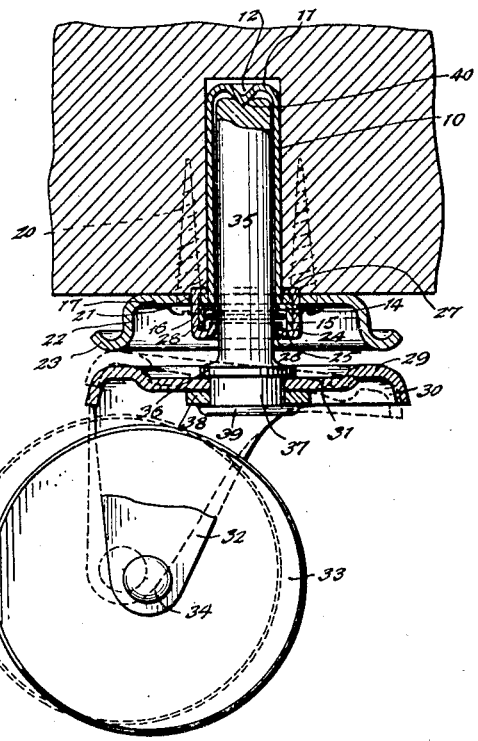
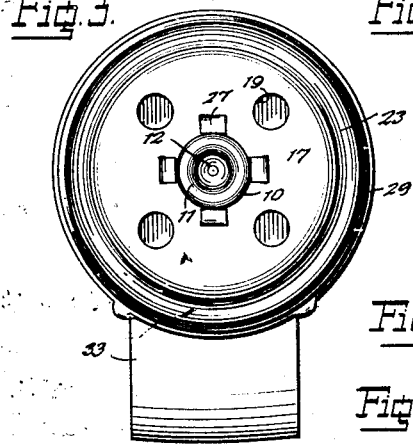
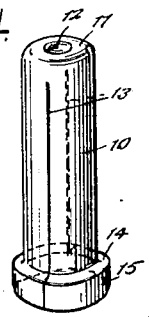
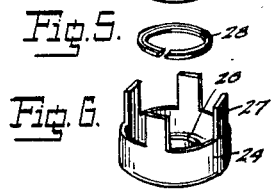
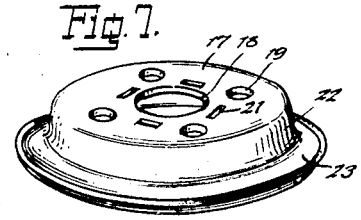
INVENTOR.
WALTER F. HEROLD.
BY
ATTORNEY.

Patented Nov. 15, 1927.

1,649,529

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

CASTER.

Application filed December 10, 1926. Serial No. 153,818.

The present invention relates to improvements in casters adapted for use particularly with heavy articles, as refrigerators, refrigerating machines, factory trucks and the like, in which use the casters are often subject to very heavy shock and strain, as when rolling the articles off a step or curb, or in rolling them against an obstruction.

It is an object of the invention to provide a caster and socket construction in which a degree of resiliency is permitted under sudden impact from shock or strain, and to provide bumper means adapted to receive the force of such impact and to limit the flexing to a point where the elastic limit of the metal has not been reached, so that the horn or other parts of the structure will not be permanently distorted or bent.

A further object is to provide a socket including a bumper portion which, upon occasion, may act as a slide for direct contact with the floor, and also of such size and structure that it may be engaged with a roller conveyor so as to bridge the rollers.

Another object is to provide a socket in which the pintle holding means is adapted to grip upon the surface of the pintle, and with which a substantially plain pintle, free of grooves or enlargements, may be employed, and which will have no tendency to retard the swiveling of the caster; and further, to provide such means which at no time is called upon to carry any stress due to side motion or side strain, so that the holding means is practically free of wear or deterioration.

A further object is to provide a socket including a relatively large diameter bumper and slide plate, and to so combine such plate with the socket structure as to provide a simple, reliable and efficient construction.

It is also an object to provide a reinforced socket structure which may be battered to a considerable extent, without danger of distorting the structure.

With the above and other objects in view, an embodiment of the invention is shown in the accompanying drawings, and this embodiment will be hereinafter more fully described with reference thereto, and the invention will be finally pointed out in the claims.

In the drawings:

Figure 1 is a front elevation of a socket and caster according to the present embodiment of the invention.

Figure 2 is a vertical sectional view thereof inserted in the supported article, the caster wheel being shown in side elevation, and the illustration showing, in dotted lines, the deflection of the horn under sudden impact.

Figure 3 is a top plan view of the caster and socket.

Figure 4 is a perspective view of the socket shell member employed.

Figure 5 is a perspective view of the spring ring employed.

Figure 6 is a perspective view of the base member, and

Figure 7 is a perspective view of the bumper and slide plate.

Similar reference characters indicate similar corresponding parts throughout the several figures of the drawings.

Referring to the drawings, the socket, according to the present embodiment of the invention, comprises a tubular socket shell member 10 formed from flat sheet metal stock folded upon itself and providing a top portion 11 including a top center bearing 12 in the form of an inverted cone-shaped indenture, the longitudinal meeting edges of the blank providing longitudinal seams 13 at opposed sides of the socket member. At the base of the socket member there is provided an annular outwardly-bent shoulder 14 and an annular outwardly-bent flange 15, the annular under surface of the shoulder being filleted as at 16 to provide a spring-retaining seat, as will be hereinafter more fully pointed out. The bumper and slide plate 17 formed of relatively heavy gauge metal is of relative large diameter and is provided with a central opening 18 through which the socket member is engaged, so that the plate sits upon the shoulder 14 as clearly indicated in Figure 2. A number of openings 19 are provided in the plate for securing the socket to the supported article by means of screws 20, and in line with the outer periphery of the flange 15 there are provided a number (four as shown) of slots 21, these slots being preferably staggered in respect to the openings 19. At its outer periphery, the plate is flanged outwardly, as at 22, and curled outwardly, as at 23, to provide an annular slide and bumper surface, this surface being in a plane below the base of the socket, and being directly above the upper marginal surface of the caster horn, as will hereinafter more fully appear.

The socket base member 24, cupped up from sheet metal stock, is flanged inwardly, as at 25, and is provided with an upwardly-bent bottom pintle bearing flange 26, the flange 25 being beveled inwardly from its point of contact with the flange 15. At the upper edge of the base there are formed spaced upwardly-projecting lugs 27 adapted, as shown in Figure 2, to be inserted through the slots 21 of the plate 17, and bent inwardly upon the upper surface thereof to thereby secure the socket member, base member, and plate in rigidly connected relation with the shoulder 14 of the socket member and the upper edge of the base member bearing upon the under surface of the plate.

The split ring 28 is preferably of the type disclosed and claimed per se, in my co-pending application Serial No. 120,672, filed July 6, 1926, being formed of sheet metal and having a cylindrical outer periphery and a beveled flanged inner periphery, the latter having the three-fold function of imparting the necessary springiness or tension to the sheet metal, providing an upper seating surface to engage the filleted seat 21 of the socket, and providing a beveled lead surface for guiding the pintle into the socket, without any chance of jamming the ring or pulling it out of the recess. The cylindrical outer periphery and the flat upper and lower adjacent surfaces insure a positive positioning of the ring in relation to the shoulder 14 and flange 15. The inner diameter of the ring, in its normal or unsprung relation, is smaller than that of the bottom bearing flange 26, and its outer diameter is smaller than the inner diameter of the flange 15. The annular space between the flanges 15 and 26 is less than the lateral thickness of the ring, so that the latter will not lodge in this space upon being shifted laterally against the flange 15, while the beveled surface of the ring is so dimensioned that upon such shifting movement the flat under surface of the ring will not be exposed within the pintle receiving opening of the flange 26, and any possibility of jamming, through engagement with such flat surface, is prevented.

The detachable caster comprises a sheet metal horn having a substantially circular top including a raised marginal portion 29 flanged downwardly, as at 30, and a dished relatively wide centrally-apertured inner portion 31. Side portions 32 are bent downwardly from the top and have a caster wheel 33 rotatably carried therein upon an axle 34. A pintle 35 is secured in the central aperture of the horn top and is provided at its lower end with a flange 36 engaging the upper surface of the horn and a stud portion 37 engaged through said aperture and provided with a washer 38 disposed at the underside of the horn, the stud being headed over, as at 39, to rigidly secure the pintle in place. At the upper end of the pintle there is provided a cone-shaped recess 40 adapted to engage the top center bearing 12. The diameter of the pintle is such that its lower portion will expand the ring 28 and be thus held thereby against dropping out of the socket, the ring being snugly held about the pintle and freely rotatable within the recess formed between the socket and base members. In the operative or engaged position of the caster, as shown in Figure 2, the pintle has thrust-bearing upon the center top bearing 12, being held vertically by the substantial bottom bearing provided by the flange 26. The load strain between the supported article and the pintle is imposed directly upon the plate 17 and transmitted to the pintle through the relatively wide reenforced flange 14 of the socket member. The spring ring firmly retains the caster from dropping out, but its relation is such that there is no tendency to frictionally resist or retard the swiveling action of the caster.

The top of the horn is disposed with relation to the bumper flanged portion 23 of the plate 17, so that its marginal portion 29 is directly beneath said bumper portion and is normally spaced therefrom, as shown in full lines, Figure 2, the spacing in a caster having a horn top with a diameter of substantially 2½ inches, being about ⅛th of an inch, in practice. The central dished portion 30 is of such width and inherent resiliency that it is capable of considerable deflection from its normal flat position, constituting in effect a diaphragm between the rigid connection of the pintle at the center and the rigid rim of the horn top. It will be understood that the deflection under normal loads will be very slight, but upon sudden impact under a heavy load, as when dropping off a curb or step, or hitting an obstruction, the deflection will be considerable, and under such condition the bumper flange 23 limits the degree of deflection to a point where the elastic limit of the metal has not been reached (dotted lines, Figure 2), and receives the shock of the impact, so that the possibility of bending or breaking the pintle or of distorting the socket under excessive impact load is prevented. The reinforced structure of the socket base provided by the shoulder 14 and flange 15 and its rigid connection with the plate 17 is such that it is enabled to withstand very considerable side strain, and therefore provides a substantial support for the pintle near its base, which with the side support provided by the socket substantially along the full length of the pintle, effectually supports it against bending.

Before insertion of the caster, the flange 23 may be directly engaged with the floor surface, acting as a slide support, the base of the socket being clear of the floor and protected from direct contact therewith by reason of the in-set relation to the horizontal plane of the floor engaging slide surface of the curled flange 23. In the manufacture and assembly of such articles as refrigerators and refrigerating machines, the same are moved along a roller conveyor—this being almost universal practice in modern factories at the present time—and in such use the flange 23 is of such width and structure as to bridge the conveyor rollers, at the same time protecting the socket base from contact therewith.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a swivel caster, a wheel carrying element, a swivel mounting for said wheel carrying element, annular impact means disposed about said swivel mounting means, said wheel carrying element including an impact portion disposed in spaced and opposed relation to said impact means, and a portion having inherent resiliency, whereby said impact portion moves toward said impact means under load exerted on said wheel carrying element, and means adapted to determine the spacing between said impact portion and said impact means whereby movement of said impact portion toward said impact means is limited by abutment with said impact means to a point substantially within the elastic limit of said inherently resilient portion.

2. In a swivel caster, pintle receiving socket means, impact means connected in relation to said socket means, a caster wheel element including a pintle, a horn secured to said pintle, and a wheel carried by said horn, said horn having a top including an impact portion disposed in spaced and opposed relation to said impact means, and a portion having inherent resiliency disposed between said impact portion and the pintle, whereby said impact portion moves toward said impact means under load exerted on said caster wheel element, and means adapted to determine the spacing between said impact portion and said impact means whereby movement of said impact portion toward said impact means is limited by abutment with said impact means to a point substantially within the elastic limit of said inherently resilient portion.

3. In a swivel caster, a wheel carrying element, a swivel mounting for said wheel carrying element, impact means connected in relation to said swivel mountings, said wheel carrying element including a horn having an inherently resilient top portion and a rigid annular impact portion disposed in spaced and opposed relation to said impact means, whereby said impact portion moves toward said impact means under load exerted on said wheel carrying element, and means adapted to determine the spacing between said impact portion and said impact means whereby movement of said impact portion toward said impact means is limited by abutment with said impact means to a point substantially within the elastic limit of said inherently resilient portion.

4. In a swivel caster, a wheel carrying element, a swivel mounting for said wheel carrying element, impact means connected in relation to said swivel mounting, said wheel carrying element including an impact portion disposed in spaced and opposed relation to said impact means, and a portion having inherent resiliency, whereby said impact portion moves toward said impact means under load exerted on said wheel carrying element, and thrust bearing means cooperating between said wheel carrying element and said swivel mounting adapted to determine the spacing between said impact portion and said impact means whereby movement of said impact portion towards said impact means is limited by abutment with said impact means to a point substantially within the elastic limit of said inherently resilient portion.

5. In a swivel caster, a socket element comprising pintle receiving socket means, and an impact bumper plate secured to said socket means and including an annular impact portion spaced about said socket means, a caster wheel element including a pintle, a horn secured to said pintle, and a wheel carried by said horn, said horn having a top including an impact portion disposed in spaced and opposed relation to said annular impact portion of the socket means, and an inherently resilient portion disposed between said last mentioned portion and said pintle, whereby said horn impact portion moves towards said socket means impact portion under load exerted on said caster wheel element, and thrust bearing means adapted to determine the spacing between said impact portions whereby movement of said horn impact portion toward said socket means impact portion is limited by abutment with said latter portion to a point substantially within the elastic limit of said inherently resilient portion.

6. In a swivel caster, a socket element comprising pintle receiving socket means, a plate secured to said socket means extending laterally outwardly therefrom and including a downwardly offset annular impact portion spaced about said socket means, spring ring retaining pocket forming means secured at the base of said socket means and disposed inwardly of the horizontal plane of said impact portion, and a pintle retaining spring ring loosely retained in said pocket, a caster wheel element including a pintle, a horn secured to said pintle, and a wheel carried by said horn, said horn having a top including an impact portion disposed in spaced and opposed relation to said annular impact portion, and an inherently flexible portion disposed between said last mentioned portion and the pintle whereby said horn impact portion moves towards said annular impact portion under load exerted on said caster wheel element, and thrust bearing means adapted to determine the spacing between said impact portions whereby movement of said horn impact portion toward said annular impact portion is limited by abutment with said latter impact portion to a point substantially within the elastic limit of said inherently resilient portion.

Signed at Bridgeport, county of Fairfield, and State of Connecticut, this 30th day of November, 1926.

WALTER F. HEROLD.